(12) United States Patent
Cai et al.

(10) Patent No.: US 10,647,346 B2
(45) Date of Patent: May 12, 2020

(54) ELECTRICALLY-POWERED RECIRCULATING-BALL STEERING GEAR ASSEMBLY

(71) Applicant: China Automotive Systems, Inc., Wuhan (CN)

(72) Inventors: Haimian Cai, Ann Arbor, MI (US); Tianyi Qiu, Troy, MI (US); Siqi Zuo, Rochester Hills, MI (US)

(73) Assignee: CHINA AUTOMOTIVE SYSTEMS, INC, Wuhan (CN)

(*) Notice: Subject to any disclaimer, the term of this patent is extended or adjusted under 35 U.S.C. 154(b) by 220 days.

(21) Appl. No.: 15/904,934

(22) Filed: Feb. 26, 2018

(65) Prior Publication Data

US 2018/0244305 A1 Aug. 30, 2018

Related U.S. Application Data

(60) Provisional application No. 62/462,953, filed on Feb. 24, 2017.

(51) Int. Cl.
*B62D 5/04* (2006.01)
*F16H 25/22* (2006.01)
(Continued)

(52) U.S. Cl.
CPC .......... *B62D 5/0448* (2013.01); *B62D 5/001* (2013.01); *B62D 5/04* (2013.01); *B62D 5/0403* (2013.01);
(Continued)

(58) Field of Classification Search
CPC ........ B62D 5/0448; B62D 5/001; B62D 5/04; B62D 5/0403; B62D 5/0421;
(Continued)

(56) References Cited

U.S. PATENT DOCUMENTS

| 2,248,251 | A | | 7/1941 | Reeves |
| 4,625,624 | A | | 12/1986 | Adams |
| 5,327,986 | A | * | 7/1994 | Saita ........................ B62D 5/04 180/446 |
| 6,776,252 | B1 | | 8/2004 | Andonian et al. |

(Continued)

FOREIGN PATENT DOCUMENTS

| CN | 1 647 984 A | * | 8/2005 |
| CN | 1647984 A | | 8/2005 |

(Continued)

OTHER PUBLICATIONS

International Search Report; PCT/US2018/019698; dated Jun. 12, 2018.

*Primary Examiner* — Kevin Hurley
*Assistant Examiner* — Marlon A Arce
(74) *Attorney, Agent, or Firm* — Dickinson Wright PLLC

(57) ABSTRACT

A worm shaft (46) has a first end section (52) and a second end section (54) extending from a worm section (50). A first drive system (98) is in driving engagement with the first end section (52) of the worm shaft (46), and a second drive system (104) is in driving engagement with the second end section (54) of the worm shaft (46) for redundantly steering a vehicle. The worm section (50) of the worm shaft (46) is disposed between the first drive system (98) disposed on the first end section (52) of the worm shaft (46) and the second drive system (104) disposed on the second end section (54) of the worm shaft (46). A lost motion connection (82) is disposed between an input shaft (76) and said worm shaft (46).

7 Claims, 4 Drawing Sheets

(51) Int. Cl.
  *F16H 25/20* (2006.01)
  *B62D 5/00* (2006.01)
  *F16C 1/02* (2006.01)
(52) U.S. Cl.
  CPC ......... *B62D 5/0421* (2013.01); *B62D 5/0463* (2013.01); *F16H 25/205* (2013.01); *F16H 25/2214* (2013.01); *F16C 1/02* (2013.01); *F16H 25/2204* (2013.01); *F16H 2025/209* (2013.01); *F16H 2025/2031* (2013.01); *F16H 2025/2075* (2013.01); *F16H 2025/2084* (2013.01); *F16H 2025/2087* (2013.01)
(58) Field of Classification Search
  CPC . B62D 5/0463; F16H 25/205; F16H 25/2214; F16H 25/2204; F16H 2025/2031; F16H 2025/2075; F16H 2025/2084; F16H 2025/2087; F16H 2025/209; F16C 1/02
  See application file for complete search history.

(56) References Cited

U.S. PATENT DOCUMENTS

| | | | | |
|---|---|---|---|---|
| 7,014,008 | B2* | 3/2006 | Furumi | B62D 5/04 |
| | | | | 180/443 |
| 7,520,367 | B2* | 4/2009 | Nakatsu | B62D 5/008 |
| | | | | 180/402 |
| 2012/0241244 | A1 | 9/2012 | Escobedo et al. | |
| 2015/0291208 | A1* | 10/2015 | Miyasaka | B62D 5/003 |
| | | | | 701/41 |
| 2018/0037254 | A1* | 2/2018 | Izutani | B62D 5/003 |

FOREIGN PATENT DOCUMENTS

| | | | |
|---|---|---|---|
| CN | 101700786 A | | 5/2010 |
| CN | 102 717 827 A | * | 10/2012 |
| CN | 102717827 A | | 10/2012 |
| EP | 1167161 A | | 1/2002 |

* cited by examiner

ELECTRICALLY-POWERED RECIRCULATING-BALL STEERING GEAR ASSEMBLY

CROSS REFERENCE TO RELATED APPLICATION

This U.S. Utility Patent Application claims the benefit of and priority to U.S. Provisional Patent Application Ser. No. 62/462,953 filed Feb. 24, 2017, the disclosure of which is incorporated herein by reference in its entirety.

BACKGROUND OF THE INVENTION

1. Field of the Invention

An electrically-powered recirculating-ball steering gear assembly for steering a vehicle.

2. Description of the Prior Art

Such electrically-powered recirculating-ball steering gear assemblies include a worm shaft extending along an axis and having a worm groove extending helically to establish a worm section. The worm shaft has a first end section and a second end section extending from opposite ends of the worm section. A first drive system is in driving engagement with the first end section of the worm shaft and a second drive system is included for providing a steering force in response to a secondary steering input. One such assembly is disclosed in U.S. Pat. No. 6,776,252, but the two drive systems in series upstream of the worm require complex engineering to provide two separate drives extending axially to the worm section.

SUMMARY OF THE INVENTION

The second drive system in the instant invention is in driving engagement with the second end section of the worm shaft for redundantly steering the vehicle, whereby the worm section of the worm shaft is disposed between the first drive system disposed on the first end section of the worm shaft and the second drive system disposed on the second end section of the worm shaft, i.e. the drive systems are in parallel at opposite ends of the worm section.

Advantages of the Invention

The invention in its broadest aspect reduces complex engineering by placing the drive systems in parallel at each end of the worm shaft. Additionally, having parallel drive systems reduces the footprint and improves packaging relative to the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
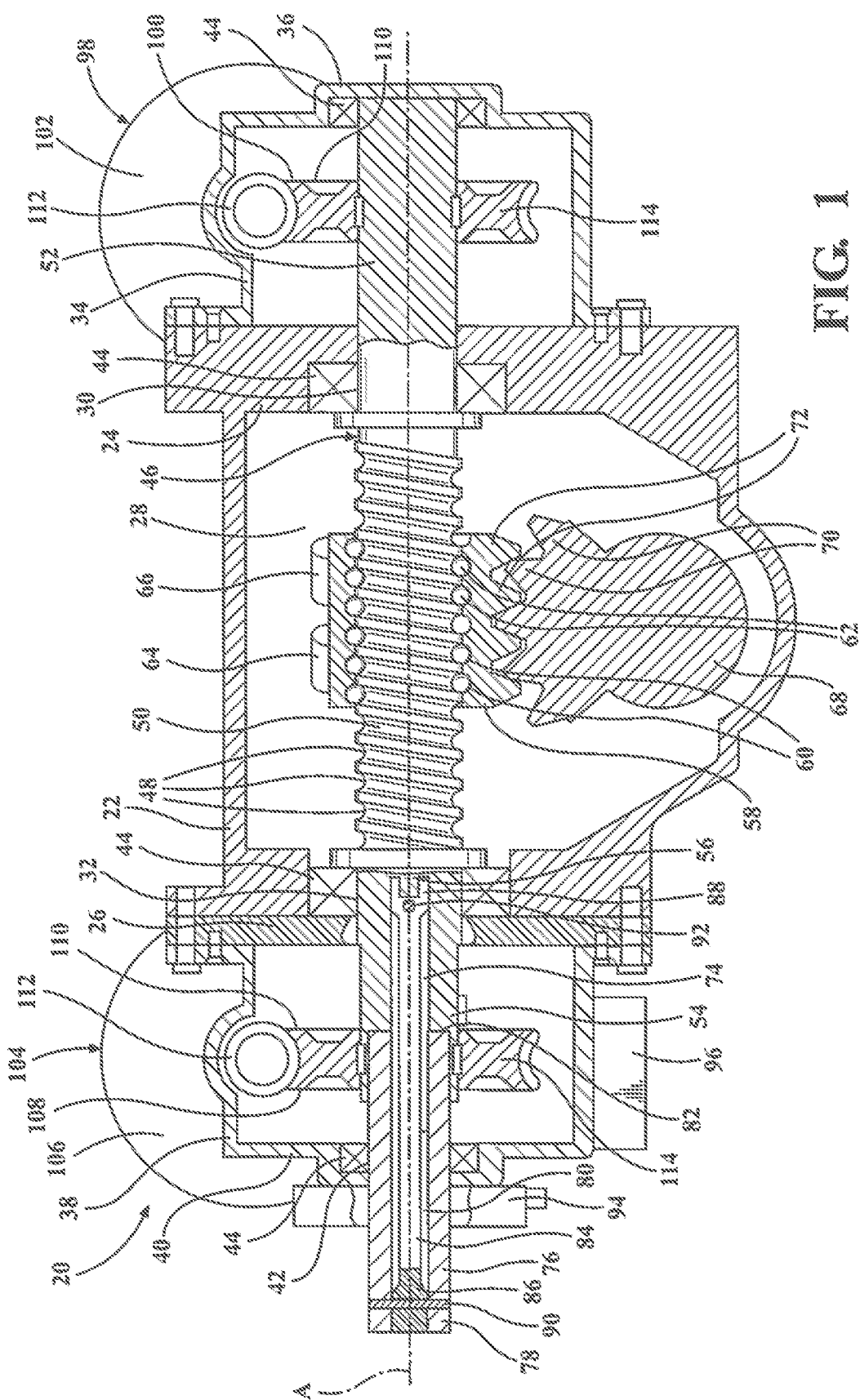
FIG. 1 is a cross-sectional view of a first embodiment.

Referring to the Figures, wherein like numerals indicate corresponding parts throughout the several views. An electrically-powered recirculating-ball steering gear assembly 20 for steering a vehicle includes a main housing 22 that has a first side wall 24 and a second side wall 26 parallel and spaced from the first side wall 24 along a axis A to establish a chamber 28 therebetween.

The first side wall 24 has a first worm opening 30 disposed on the axis A. The second side wall 26 has a second worm opening 32 disposed on the axis A. A first side housing 34 is connected to the first side wall 24 around the first worm opening 30 in the main housing 22. The first side housing 34 has a protrusion 36 opposite the first worm opening 30. A second side housing 38 is connected to the main housing 22 through the second worm opening 32 and shares the second side wall 26 with the main housing 22. The second side housing 38 has an input wall 40 located parallel to and opposite the second side wall 26. The input wall 40 has an input opening 42 spaced opposite the second worm opening 32 along the axis A. A low friction bearing 44 is disposed in each of the worm openings 30, 32 and the input opening 42 and the protrusion 36.

A worm shaft 46 extends along the axis A in the chamber 28 and through the low friction bearings 44 in each of the worm openings 30, 32 of the main housing 22. The worm shaft 46 has a worm groove 48 that extends helically to establish a worm section 50 disposed in the chamber 28. The worm shaft 46 has a first end section 52 that extends from the worm section 50 and into the low friction bearing 44 in the first worm opening 30 and into the first side housing 34.

The worm shaft 46 has a second end section 54 that has a worm end 56 adjacent the worm section 50 and extends from the worm end 56 and into the low friction bearing 44 in the second worm opening 32 and into the second side housing 38. A ball nut 58 is disposed about a portion of the worm section 50 of the worm shaft 46 and has ball raceways 60 that face the worm section 50 of the worm shaft 46 established helically within the ball nut 58. A plurality of ball bearings 62 that are spherical in shape are disposed in the worm grooves 48 of the worm section 50 of the worm shaft 46 and in the ball raceways 60 of the ball nut 58.

A first recirculating ball mechanism 64 is disposed within the ball nut 58 to recirculate the plurality of ball bearings 62 once the plurality of ball bearings 62 rotate about the worm section 50 two and a half times. A second recirculating ball mechanism 66 is disposed adjacent to the first recirculating ball mechanism 64 within the ball nut 58 to recirculate the plurality of ball bearings 62 once the plurality of ball bearings 62 rotate about the worm section 50 two and a half times.

An output shaft 68 for driving a Pitman arm has an output teeth set 70 disposed radially on the output shaft 68. A nut teeth set 72 extends from the ball nut 58 and engages the output teeth set 70 to move the ball nut 58 linearly along the axis A and to rotate the output shaft 68 in response to the rotation of the worm shaft 46.

The worm shaft 46 has a worm bore 74 within the second end section 54 of the worm shaft 46 along the axis A and closed at the worm end 56 of the second end section 54 of the worm shaft 46. An input shaft 76 responsive to rotation of a steering wheel extends from the second end section 54 of the worm shaft 46 along the axis A and through the low friction bearing 44 in the input opening 42 to an input end 78 and has an input bore 80 within the input shaft 76 along the axis A that is closed at the input end 78 of the input shaft 76. There is a lost motion connection 82 between the input shaft 76 and the second end section 54 of the worm shaft 46 that allows relative lost motion of three to four degrees between the input shaft 76 and the worm shaft 46. A torsion bar 84 extends axially within the input bore 80 and the worm bore 74 and interconnects the input shaft 76 and the worm shaft 46 for biasing against the relative lost motion and has a first torsion end 86 and a second torsion end 88 disposed opposite each other. A first pin 90 extends transversally to the axis A and connects the first torsion end 86 of the torsion bar 84 to the input end 78 of the input shaft 76. A second pin 92 extends transversally to the axis A and connects the second torsion end 88 of the torsion bar 84 to the worm end 56 of the second end section 54 of the worm shaft 46. A torque sensor 94 is disposed about the input shaft 76 for measuring the torque in the input shaft 76 and communicating the torque to the electronic control unit 96.

A first drive system 98 is in the first side housing 34 to provide a steering force in response to a primary steering input. The first drive system 98 includes a first gear set 100 disposed in the first side housing 34 and in driving engagement with the first end section 52 of the worm shaft 46 and a first motor 102 supported by the first side housing 34 and connected to the first gear set 100 and responsive to an electrical signal to rotate the worm shaft 46.

A second drive system 104 for providing a steering force in response to a secondary steering input includes a second motor 106 for redundantly steering the vehicle and a second gear set 108 in driving engagement with the second motor 106 for receiving mechanical input from the second motor 106. The second drive system 104 is mounted in the second side housing 38 and is in driving engagement with the second end section 54 of the worm shaft 46. The worm section 50 of the worm shaft 46 is disposed between the first drive system 98 on the first end section 52 of the worm shaft 46 and the second drive system 104 on the second end section 54 of the worm shaft 46. Placing the drive systems in parallel allows for reduced complexity and a reduction in packaging footprint relative to placing the drive systems in series.

In FIG. 1, the first gear set 100 of first drive system 98 is a worm reducer 110 that includes a worm gear 112 and a spur gear 114. The second gear set 108 of the second gear system is also a worm reducer 110 that includes a worm gear 112 and a spur gear 114.

Figure 2:
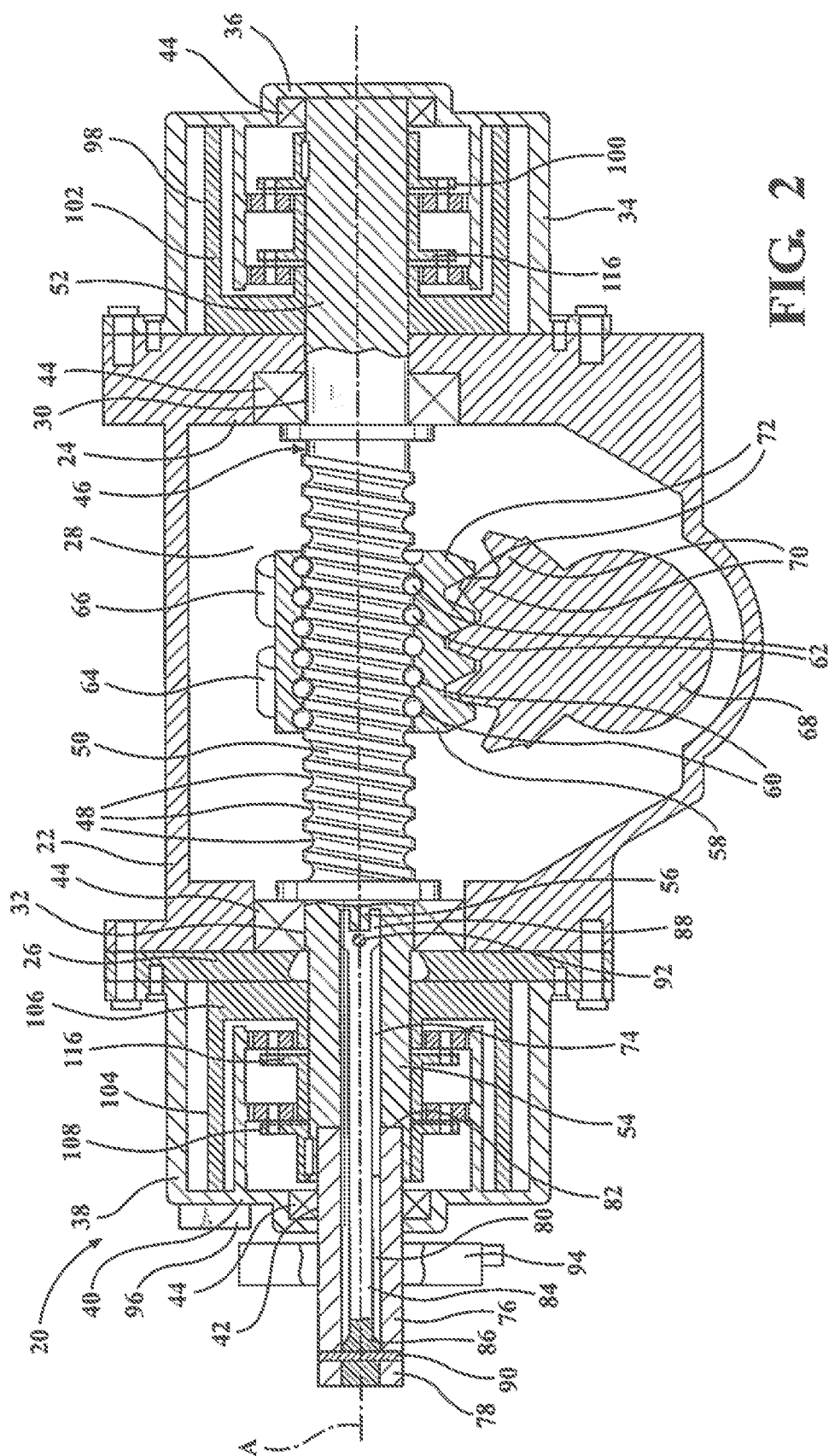
FIG. 2 is a cross-sectional view of a second embodiment.

In FIG. 2, the first gear set 100 of the first drive system 98 is a planetary gear group 116 and the first motor 102 is mounted coaxially with the worm shaft 46. The second gear set 108 of the second gear system is also a planetary gear group 116 and the second motor 106 is also mounted coaxially with the worm shaft 46.

Figure 3:
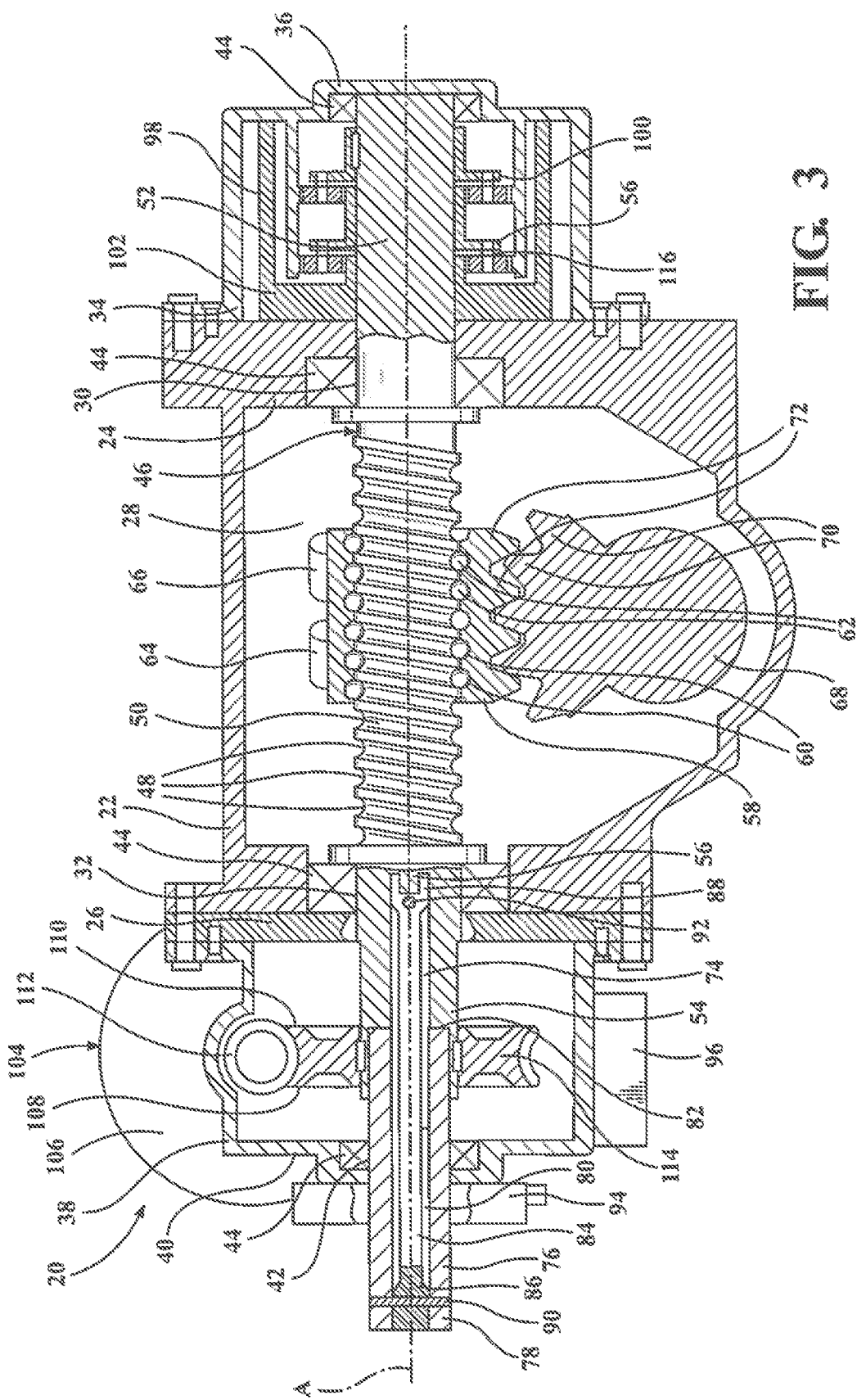
FIG. 3 is a cross-sectional view of a third embodiment.

In FIG. 3, the first gear set 100 of the first drive system 98 is a planetary gear group 116 and the first motor 102 is mounted coaxially with the worm shaft 46. The second gear set 108 of the second gear system is a worm reducer 110 that includes a worm gear 112 and a spur gear 114.

Figure 4:
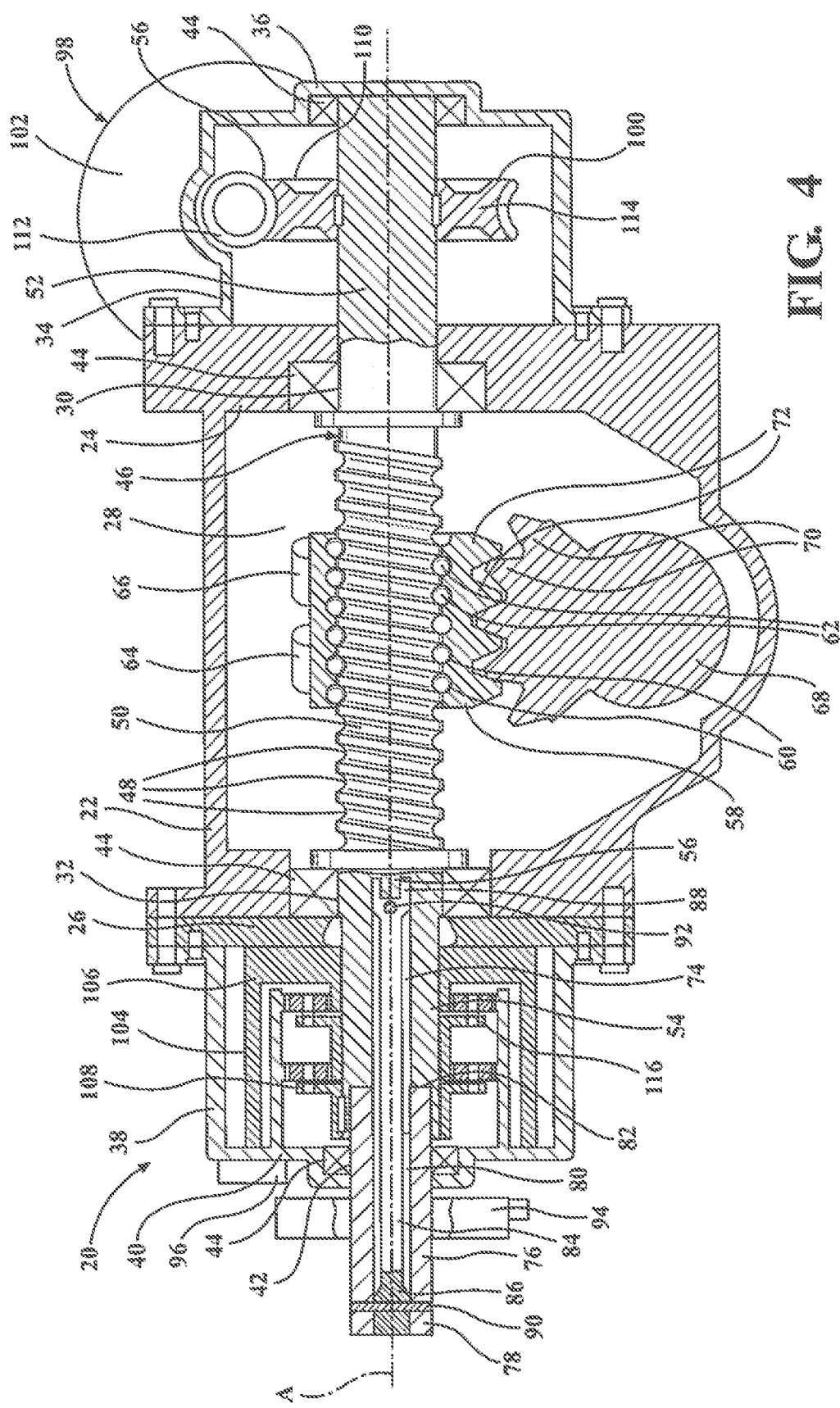
FIG. 4 is a cross-sectional view of a fourth embodiment.

In FIG. 4, the first gear set 100 of first drive system 98 is a worm reducer 110 that includes a worm gear 112 and a spur gear 114. The second gear set 108 of the second gear system is a planetary gear group 116 and the second motor 106 is mounted coaxially with the worm shaft 46.

An electronic control unit 96 is electrically connected to the first motor 102 for responding to vehicle sensors and processors to control the amount of torque of the first motor 102 to apply to the worm shaft 46 to produce the required movement of the output shaft 68 to turn the wheels of the vehicle.

Obviously, many modifications and variations of the present invention are possible in light of the above teachings and may be practiced otherwise than as specifically described while within the scope of the appended claims.

That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An electrically-powered recirculating-ball steering gear assembly (20) for steering a vehicle, said assembly (20) comprising;

a worm shaft (46) extending along an axis (A) and including a worm groove (48) extending helically to establish a worm section (50), said worm shaft (46) having a first end section (52) and a second end section (54) extending from said worm section (50), a first drive system (98) in driving engagement with said first end section (52) of said worm shaft (46), a second drive system (104) for providing a steering force in response to a secondary steering input, said second drive system (104) being in driving engagement with said second end section (54) of said worm shaft (46) for redundantly steering the vehicle with said worm section (50) of said worm shaft (46) being disposed between said first drive system (98) disposed on said first end section (52) of said worm shaft (46) and said second drive system (104) disposed on said second end section (54) of said worm shaft (46);

an input shaft (76) responsive to rotation of a steering wheel extending from said second end section (54) of said worm shaft (46) along said axis (A), and a lost motion connection (82) disposed between said input shaft (76) and said worm shaft (46) for allowing relative lost motion between said input shaft (76) and said worm shaft (46) independent of said drive systems (98, 104).

2. An assembly (20) as set forth in claim 1 wherein one of said drive systems (98, 104) includes a motor (102, 106) for driving said worm shaft (46), and a worm reducer (110) including a worm gear (112) and a spur gear (114) connecting said motor (102, 106) to said worm shaft (46) for driving said worm shaft (46).

3. An assembly (20) as set forth in claim 1 wherein one of said drive systems (98, 104) includes a motor (102, 106) for driving said worm shaft (46), and a planetary gear group (116) connecting said motor (102, 106) to said worm shaft (46) for driving said worm shaft (46), wherein said motor (102, 106) is mounted coaxially with said worm shaft (46).

4. An electrically-powered recirculating-ball steering gear assembly (20) for steering a vehicle, said assembly (20) comprising;

a main housing (22) having a first side wall (24) and a second side wall (26) parallel and spaced from said first side wall (24) along a axis (A) to establish a chamber (28) therebetween, said first side wall (24) having a first worm opening (30) disposed on said axis (A), said second side wall (26) having a second worm opening (32) disposed on said axis (A), a first side housing (34) connected to said first side wall (24) around said first worm opening (30) in said main housing (22)

said first side housing (34) having a protrusion (36) opposite said first worm opening (30), a second side housing (38) connected to said main housing (22) through said second worm opening (32) and sharing said second side wall (26) with said main housing (22), said second side housing (38) having an input wall (40) located parallel to and opposite said second side wall (26), said input wall (40) having an input opening (42) spaced opposite said second worm opening (32) along said axis (A), a low friction bearing (44) disposed in each of said worm openings (30, 32)) and said input opening (42) and said protrusion (36), a worm shaft (46) extending along said axis (A) in said chamber (28) and through said low friction bearings (44) in each of said worm openings (30, 32)) of said main housing (22), said worm shaft (46) including a worm groove (48) extending helically to establish a worm section (50) disposed in said chamber (28), said worm shaft (46) having a first end section (52) extending from said worm section (50) and into said low friction bearing (44) in said first worm opening (30) and into said first side housing (34), a first drive system (98) in said first side housing (34) for providing a steering force in response to a primary steering input including, a first gear set (100) disposed in said first side housing (34) and in driving engagement with said first end section (52) of said worm shaft (46), a first motor (102) supported by said first side housing (34) and connected to said first gear set (100) and responsive to an electrical signal for rotating said worm shaft (46), said worm shaft (46) having a second end section (54) having a worm end (56) adjacent said worm section (50) and extending from said worm end (56) and into said low friction bearing (44) in said second worm opening (32) and into said second side housing (38) a ball nut (58) disposed about a portion of said worm section (50) of said worm shaft (46) and having ball raceways (60) facing said worm section (50) of said worm shaft (46) established helically within said ball nut (58), a plurality of ball bearings (62) each spherical in shape and disposed in said worm grooves (48) of said worm section (50) of said worm shaft (46) and in said ball raceways (60) of said ball nut (58), a first recirculating ball mechanism (64) disposed within said ball nut (58) for recirculating said plurality of ball bearings (62) once said plurality of ball bearings (62) rotate about said worm section (50) two and a half times, a second recirculating ball mechanism (66) disposed adjacent to said first recirculating ball mechanism (64) within said ball nut (58) for recirculating said plurality of ball bearings (62) once said plurality of ball bearings (62) rotate about said worm section (50) two and a half times, an output shaft (68) for driving a Pitman arm having an output teeth set (70) disposed radially on said output shaft (68), a nut teeth set (72) extending from said ball nut (58) and engaging said output teeth set (70) for moving said ball nut (58) linearly along said axis (A) and to rotate said output shaft (68) in response to the rotation of said worm shaft (46), an electronic control unit (96) electrically connected to said first motor (102) for responding to vehicle sensors and processors to control the amount of torque of said first motor (102) to apply to said worm shaft (46) to produce the required movement of said output shaft (68) to turn the wheels of the vehicle, a second drive system (104) for providing a steering force in response to a secondary steering input including, a second motor (106) for redundantly steering the vehicle, a second gear set (108) in driving engagement with said second motor (106) for receiving mechanical input from said second motor (106), and said second drive system (104) mounted in said second side housing (38) in driving engagement with said second end section (54) of said worm shaft (46) with said worm section (50) of said worm shaft (46) being disposed between said first drive system (98) disposed on said first end section (52) of said worm shaft (46) and said second drive system (104) disposed on said second end section (54) of said worm shaft (46).

5. An assembly (20) as set forth in claim 4 further including;

said worm shaft (46) having a worm bore (74) within said second end section (54) of said worm shaft (46) along said axis (A) and closed at said worm end (56) of said second end section (54) of said worm shaft (46), an input shaft (76) responsive to rotation of a steering wheel extending from said second end section (54) of said worm shaft (46) along said axis (A) and through said low friction bearing (44) in said input opening (42) to an input end (78) and having an input bore (80) within said input shaft (76) along said axis (A) and closed at said input end (78) of said input shaft (76), a lost motion connection (82) between said input shaft (76) and said second end section (54) of said worm shaft (46) for allowing relative lost motion of three to four degrees between said input shaft (76) and said worm shaft (46), a torsion bar (84) extending axially within said input bore (80) and said worm bore (74) and interconnecting said input shaft (76) and said worm shaft (46) for biasing against the relative lost motion and having a first torsion end (86) and a second torsion end (88) disposed opposite each other, a first pin (90) extending transversally to said axis (A) and connecting said first torsion end (86) of said torsion bar (84) and said input end (78) of said input shaft (76), a second pin (92) extending transversally to said axis (A) and connecting said second torsion end (88) of said torsion bar (84) and said worm end (56) of said second end section (54) of said worm shaft (46), and a torque sensor (94) disposed about said input shaft (76) for measuring the torque in said input shaft (76) and communicating the torque to said electronic control unit (96).

6. An assembly (20) as set forth in claim 4 wherein;

one of said gear sets (100, 108) of said drive systems (98, 104) includes a worm reducer (110) including a worm gear (112) and a spur gear (114) connected to and driving said worm shaft (46), and one of said motors (102, 106) being mounted perpendicular to both said spur gear (114) and said worm shaft (46) and in driving engagement with said worm gear (112).

7. An assembly (20) as set forth in claim 4 wherein;

one of said gear sets (100, 108) of said drive systems (98, 104) includes a planetary gear group (116) connected to said worm shaft (46) for driving said worm shaft (46), and one of said motors (102, 106) being mounted coaxially with said worm shaft (46) and in driving engagement with said planetary gear group (116).

* * * * *